# HEXAMETHYLBENZENE MOLYBDENUM TRICARBONYL

Donald H. Antonsen, New Castle, Del., assignor to Sun Oil Company, Philadelphia, Pa., a corporation of New Jersey
No Drawing. Filed Dec. 15, 1958, Ser. No. 780,244
1 Claim. (Cl. 260—429)

This invention relates to a new composition of matter. More specifically, the invention is directed to hexamethylbenzene molybdenum tricarbonyl as a new composition of matter having utility as an additive in hydrocarbon motor fuels for internal combustion engines.

The new composition of matter of this invention, viz., hexamethylbenzene molybdenum tricarbonyl, is a stable coordination compound, or complex, in which molybdenum is joined by co-ordinate linkage with hexamethylbenzene and with three carbonyl groups. It can be represented by the constitutional formula, $$C_6(CH_3)_6 \cdot MO \cdot (CO)_3$$

This complex is a lemon-yellow crystalline solid having a melting point of about 338° F. It decomposes at a temperature of approximately 437° F.

Hexamethylbenzene molybdenum tricarbonyl is a reaction product of hexamethylbenzene and molybdenum hexacarbonyl and can be conveniently prepared from these materials. For example, one method comprises heating equimolar quantities of solid hexamethylbenzene (M.P.=330.8° F.; B.P.=509° F.) and solid molybdenum hexacarbonyl in the presence of an inert liquid reaction medium which is preferably a saturated hydrocarbon or a mixture of such hydrocarbons. Suitable reaction temperatures are in the range of from about 275° F. to a maximum of about 295° F. The latter temperature limitation is significant in that molybdenum hexacarbonyl decomposes at a temperature slightly above the upper limit of 295° F., viz., at 302° F. Substantially complete reaction can be effected by maintaining the reaction mixture at a suitable temperature for a period of from about 6 to about 24 hours. It is convenient to employ, as the reaction medium, a liquid whose atmospheric boiling point falls within the range of reaction temperatures specified above. In this way, the reaction temperature can be maintained essentially constant by conducting the reaction under reflux conditions. Atmospheric pressure is also conveniently maintained throughout the reaction to permit the escape of gaseous carbon monoxide which is simultaneously produced. Although not essential, the reaction is preferably carried out under an inert atmosphere. The product of the reaction, which consists essentially of the solid crystalline complex, hexamethylbenzene molybdenum tricarbonyl, can be separated from the liquid medium by any convenient means such as filtration, or distillation if the boiling point of the liquid medium is below the decomposition temperature of the product complex. Purification to remove small amounts of unreacted reactants can be accomplished by extracting the reaction product with a boiling aromatic or naphthenic hydrocarbon which boils below about 330° F., such as methylcyclopentane or benzene, and separating the purified complex from the extract by recrystallization and filtration. Yields of up to about 90 percent can be obtained by this method. The following example will illustrate the preparation of the novel composition of matter of this invention.

Example I

Approximately 35.5 gms. (0.22 gm.-mole) of hexamethylbenzene and 57.6 gms. (0.22 gm.-mole) of molybdenum hexacarbonyl are placed in a flask containing about 200 mls. of n-decane. This reaction mixture is maintained, under vigorous agitation, at a temperature of about 288° F. for a period of about 7 hours. Thereafter, the solid reaction product and unreacted reactants are separated from the liquid medium by filtration, washed with n-pentane, and dried. The solid material is then extracted with boiling methyl-cyclopentane in a Soxhlet extractor for about 40 hours. Pure hexamethylbenzene molybdenum tricarbonyl is recovered from the extract by distilling off part of the solvent and chilling the liquid residue to cause crystallization. The crystals of pure complex are then separated by filtration, washed and dried. In this experiment, a yield of about 25.0 gms., or 28 percent by weight based on total reactants, is obtained. Higher yields can be obtained by varying the operating conditions.

As stated before, hexamethylbenzene molybdenum tricarbonyl possesses utility as an additive in hydrocarbon motor fuels for internal combustion engines. It possesses particular utility in spark-ignition engine fuels such as aviation and automotive gasoline, in which it serves as an unexpected adjuvant to organo-lead anti-knock compounds in suppressing knock and/or preignition. Thus, when used in a gasoline which also contains an organo-lead anti-knock compound, e.g., tetraethyl lead (T.E.L.), it exhibits the unexpected and highly desirable property of providing a substantial synergistic octane quality improvement. This property is all the more surprising in view of the fact that similar and closely-related complexes such as hexaethylbenzene molybdenum tricarbonyl and 1,3,5-trimethylbenzene molybdenum tricarbonyl are actually antagonistic, or detrimental, to the knock suppressing capability of the organo-lead compounds. In hydrocarbon motor fuels which do not contain an organo-lead anti-knock compound, hexamethylbenzene molybdenum tricarbonyl as well as other closely related compounds exhibits neither pro-knock nor anti-knock properties.

The following examples are presented to demonstrate the particular utility of hexamethylbenzene molybdenum tricarbonyl as an additive in hydrocarbon motor fuels. In all cases, the aromatic-molybdenum-tricarbonyl complexes were prepared in accordance with the method described herein with respect to the hexamethylbenzene derivative. This method is generally suitable for the preparation of aromatic-molybdenum tricarbonyl complexes which do not decompose at temperatures lower than about 305° F.

Example II

A mixture of predominantly saturated hydrocarbons boiling within the gasoline range, and having a research octane number (R.O.N.) of 81.7 as obtained by A.S.T.M. method D–908, is the base fuel in this experiment. When 0.26 weight percent of hexamethylbenzene molybdenum tricarbonyl is incorporated in this base fuel, the R.O.N. of the resultant composition remains approximately the same, viz., 81.5. This demonstrates that hexamethylbenzene molybdenum tricarbonyl, by itself, exhibits no knock-inhibiting effect when present alone in the base fuel. On the other hand, incorporation of 3 cc. of T.E.L. compound per gallon in the same base fuel, together with the customary accompanying amounts of halohydrocarbon lead scavengers, raises the R.O.N. by a substantial amount, viz., from 81.7 to 94.6, as would be expected. However, addition of both hexamethylbenzene molybdenum tricarbonyl and T.E.L. to the base fuel in the above respective concentrations unexpectedly results in raising the R.O.N. of the resultant composition to 96.5, representing a synergistic benefit of almost 2 research octane numbers. This illustrates the significant usefulness of hexamethylbenzene molybdenum tricarbonyl as an additive in hydrocarbon motor fuels which also contain an organo-lead anti-knock compound.

Example III

In this example, the base fuel is the unleaded base stock for a commercially available gasoline. This base fuel has a R.O.N. of 96.0, and an approximate volumetric composition of 52 percent saturated hydrocarbons and 48 percent of olefinic and aromatic hydrocarbons. Addition of 3 cc. of T.E.L. per gallon to the base fuel raises the R.O.N. to 105.4. However, when 0.40 weight percent of hexaethylbenzene molybdenum tricarbonyl and 3 cc. of T.E.L. per gallon are both added to the base fuel, the R.O.N. of the resultant composition is only 104.0, or almost 1.5 numbers below that achieved by use of the T.E.L. alone. This demonstrates that hexaethylbenzene molybdenum tricarbonyl is actually detrimental to the knock-suppressing effectiveness of the organo-lead compound. In contradistinction, hexamethylbenzene molybdenum tricarbonyl, a closely-related material, provides a synergistic octane improvement when used with T.E.L. as demonstrated in Example II. This demonstrates the unexpected utility of hexamethylbenzene molybdenum tricarbonyl when compared with similar and closely-related complexes.

Example IV

The behavior of 1,3,5-trimethylbenzene molybdenum tricarbonyl is similar to that of hexaethylbenzene molybdenum tricarbonyl, as described in Example III above, and again demonstrates the surprising usefulness of hexamethylbenzene molybdenum tricarbonyl as a motor fuel additive. Thus, 0.40 weight percent of 1,3,5-trimethylbenzene molybdenum tricarbonyl in a conventional catalytic gasoline, having an approximate volumetric composition of 35 percent saturated hydrocarbons and 65 percent of olefinic and aromatic hydrocarbons, causes no change in the base fuel's R.O.N. of 88.9. Addition of 3 cc. of T.E.L. per gallon to the base fuel does raise the R.O.N. significantly, viz., to 96.7, as would be expected. However, when both 1,3,5-trimethylbenzene molybdenum tricarbonyl and T.E.L. are present together in the base fuel, in the same respective concentrations, the R.O.N. is raised to only 92.9, or lower by almost 4 research octane numbers than when T.E.L. is employed alone.

In view of the above, it is apparent that the new composition of matter of this invention, viz., hexamethylbenzene molybdenum tricarbonyl, possesses unexpected and significant utility as a synergist for organo-lead anti-knock compounds in improving the octane quality of motor fuels in which both are incorporated.

In my copending patent application, Serial No. 780,189, filed December 15, 1958, I have disclosed and claimed gasoline containing an organo-lead anti-knock compound and hexamethylbenzene molybdenum tricarbonyl as a novel composition of matter.

The invention claimed is:
Hexamethylbenzene molybdenum tricarbonyl.

References Cited in the file of this patent

Fischer et al.: Z. Anorg. Allgem. Chem. 286, 146–148 (1956).

Fischer et al.: Angew. Chem. 69, 715, Nov. 21, 1957.

Nicholls et al.: Proceedings of the Chemical Society (London) (p. 152, May 1958).